3,761,298
PURIFICATION OF TITANIUM SULFATE SOLUTIONS

Arthur Delbert Coon, Savannah, Ga., Gerard Martin Sheehan, Lynchburg, Va., and Paul Montgomery Dupree, Flemington, N.J., assignors to American Cyanamid Company, Stamford, Conn.
No Drawing. Filed Apr. 1, 1971, Ser. No. 130,450
Int. Cl. C09c 1/36
U.S. Cl. 106—300      5 Claims

ABSTRACT OF THE DISCLOSURE

This disclosure describes the manufacture of titanium dioxide pigment of increased brightness by utilizing titanium salt solutions contacted with activated charcoal as the precursor for hydrolysis seeds and/or the hydrous titania coatings of pigment.

---

This invention relates to the manufacture of titanium dioxide pigments and more particularly to a process for improving color brightness of pigment by employing a specially clarified titanium salt solution as a source of hydrous titania.

As will be brought out hereafter, this invention utilizes a modified reagent incorporable into the several known methods of preparing $TiO_2$ pigments which results in optically brightening the pigment. Other objects of this invention will be understood from a reading of this specification.

In the manufacture of titanium dioxide from ferrotitaniferrous ores and slags it is conventional to treat the crude material or mixtures thereof with sulfuric acid to obtain a digestion mass or cake comprising largely acid- and water-soluble sulfates of titanium, iron, and minor impurities. In practice, ilmenite and/or titanium bearing slags are comminuted and then reacted at elevated temperatures with concentrated sulfuric acid in a suitable vessel to form the metallic sulfates. The titanium sulfate-iron sulfate liquor resulting from the sulfuric acid reaction is filtered to remove undissolved reactants and concentrated by evaporation to remove some of the water. A hydrolysis seeding agent is added to the concentrated solution, and the mixture is heated near or to the boiling point to effect hydrolysis of the titanium, which is insoluble in the acid solution. The resulting precipitated hydrous titania is filtered, washed, dried, calcined, and milled in order that it can be used as a pigment. It is important that the seed employed for the preparation of the hydrous titania be generally of a small particle size and that it be in the form of a suitable hydrous titanium oxide sol (or washed coagulum thereof) which will disperse readily in the titanium sulfate-iron sulfate system. When such seed is incorporated in small quantities into a titanium sulfate-iron sulfate system, essentially only the titanium values will hydrolyze and precipitate, even though the solution itself may contain other salts, such as iron and aluminum sulfates. Hydrolysis is usually effected by heating the material, preferably at the boiling point of the solution, at atmospheric or higher pressures until substantially all of the titanium values have been precipitated.

Titanium sulfate-iron sulfate systems, without seed, can be only incompletely hydrolyzed by heating. The hydrolysate so produced yields, after calcination, pigment of poor quality. However, if a seed is added prior to hydrolysis, then the hydrous titania obtained results in high-quality $TiO_2$ pigment after calcination. The hydrolysis seed is prepared from the hydrolysis of relatively pure titanium salt solutions; see U.S. Pat. 1,758,528 issued May 13, 1930 (Re. 18,790).

Titanium dioxide pigments of both the rutile and anatase crystal structure have heretofore been prepared both by the method mentioned above and by the oxidation of titanium tetrachloride. Of the two resultant titanium dioxide crystal modifications, rutile titanium dioxide is perhaps more universally used because of its optimum tinting strength and other physical and chemical characteristics well known to those skilled in the art.

However, the optical and other pigmentary properties of both can be improved by treatment of the anhydrous titanium dioxide in aqueous slurries with hydrous oxides of several metals in combinations thereof. See U.S. Pat. 3,418,147 issued Dec. 24, 1968.

The object of this invention is met in a process for the production of titanium dioxide pigments of improved color brightness wherein hydrous titania is precipitated from titanium sulfate-iron sulfate liquor in the presence of hydrolysis seed. The improvement comprises preparing said seed from a titanium sulfate solution clarified by contacting with activated charcoal.

In accordance with the objects of the invention there is also provided a process for improving the color brightness of titanium dioxide pigment which process includes the steps of: admixing an aqueous slurry of titanium dioxide pigment with an aqueous titanium sulfate solution; adjusting the pH of said admixed slurry to 5 to 9; and recovering the $TiO_2$ solids from said slurry. The improvement comprises clarifying said titanium sulfate solution before said admixture by contacting with activated charcoal and then separating the clarified solution from the charcoal.

These several objects of the invention are met by our method of clarifying titanium sulfate solutions which comprises contacting said solution, preferably derived from solution of the filtered and washed hydrolysate of the titanium sulfate-iron sulfate liquor, with activated charcoal and thereafter separating said solution from said charcoal. It is further advantageous to prior treat the titanium sulfate solution with a reducing agent such as zinc metal. Although its function is not fully understood the reducing agent appears to inhibit peroxidation of the hydrous titania.

The process of the invention is generally advantageous whenever clarified titanium sulfate solutions of high stability are required. In particular, purification of the titanium sulfate would be useful where these solutions are to be used in the hydrous oxide treatment of $TiO_2$ pigments and wherein such solutions would be used for preparation of hydrolysis seed. Pigments prepared using titanium sulfate solutions processed as described in this invention possess high color brightness. This high color brightness would, in turn, be reflected in applications of the pigment in, for example, architectural enamels, latex paints, automotive enamels, plastics, etc.

Various types of absorption grade activated charcoal, both powdered and granular have been used to clarify dilute (9–15% $TiO_2$) titanium sulfate solutions. Iron contamination has been found in varying amounts in all of the charcoals tested. This iron can be removed with an acid leech, e.g. HCl, before contacting the titanium solution with it. Both batch- and column-type techniques were employed. In some instances of difficult clarification use of chelating agents such as ethylenedinitrilotetraacetic acid which complex the metallic impurities, facilitate their absorption on the charcoal surface and consequent removal from the titanium sulfate solution. The resulting solutions were more stable, had higher clarity and were essentially colorless. Greater decolorization was obtained by first reacting the solution with zinc metal. When the clarified titanium sulfate solutions were used for the hydrous oxide treatment of $TiO_2$ pigments, a 1–2 point improvement in color brightness resulted.

The coating process of titanium dioxide pigment with a hydrous oxide of titanium has been widely practiced for many years, e.g. see U.S. Pat. 2,387,534 issued Oct. 23, 1945.

The usual method adopted for applying such a coating to the particles has been to suspend the particles in water (in the presence of a dispersing agent, if desired), hydroclassify by several established methods and thereafter to add an aqueous titanium salt solution, e.g. a dilute (9 to 15% $TiO_2$) titanium sulfate solution. The resulting mixture is thereafter treated with an alkaline solution such as ammonium hydroxide or an alkali metal hydroxide, carbonate and/or silicate, to raise the pH value until the soluble titanium content of the mixture is precipitated in the form of a hydrous oxide.

If desired, salts of other metals, for example of aluminum, may also be added with the titanium salt (or separately, as desired) before the adjustment of the pH value thereby also precipitating the hydrous oxides of these salts upon the pigment particles. Other treating reagents include salts of cerium, beryllium, zinc or tin, and they provide other hydrous oxide coatings commingled with the hydrous titanium oxide. In addition, the clarified titanium salt solution may be used for coating the titania pigment with titanium phosphate by precipitating the titanium phosphate with an appropriate phosphate solution; such as orthophosphoric acid.

The sulfate, chlorides, nitrate or acetates, of aluminum, zirconium, and/or cerium have been found to be very suitable as sources of water-soluble salts for hydrous metal oxides which are commingled with hydrous titania during coating of the pigmentary titania particles.

After the addition of these salts sufficient alkali is added to give a final pigment having a pH value in the range 5 to 11 and preferably one in the range of 7.0 to 8.5.

After coating, the pigment may be subjected to other treatments so as to obtain a dry powder essentially devoid of water soluble ionic contaminants (for example recovery by filtration, washing, drying and/or milling, particularly fluid energy milling).

The following examples illustrate the techniques and advantages of the present invention:

EXAMPLE 1

Four samples of calcined rutile $TiO_2$ after being slurried in water were classified so as to eliminate particles greater than about 4 microns in size. Each of these samples was given a hydrous oxide end treatment consisting of 1.0% $TiO_2$ added as titanic sulfate and 2.0% $Al_2O_3$ added as aluminum sulfate. Following addition of the reagents, the pH of each sample was adjusted to 7.6 with sodium hydroxide solution. After aging for four hours at 70° C. the samples were washed, dried and passed through a fluid energy mill. The differentiating feature of these samples was: Sample A, the control was treated with conventional titanium sulfate solution; Sample B was treated with titanium sulfate clarified by conventional filtration techniques; Sample C with titanium sulfate which had been clarified by contacting with activated charcoal; and Sample D was prepared with titanium sulfate which had been reacted with zinc metal and then contacted with activated charcoal. The resulting pigments were converted into white paints by a standard laboratory procedure hereinafter set forth. The resulting paints, viewed as pulldowns, were visually rated for brightness against laboratory brightness standards with the following results.

| Sample: | Pigment brightness |
| --- | --- |
| A | 100 |
| B | 100 |
| C | 101 |
| D | 102 |

EXAMPLE 2

Two samples of hydrous titania corresponding to about 550 gms. $TiO_2$ each were precipitated from titanium sulfate-iron sulfate liquor with 0.18% hydrolysis seed according to the Mecklenburg-type precipitation procedure exemplified in U.S. Pat. 1,758,528. For Sample E, hydrolysis seed prepared from conventionally purified titanic sulfate was used, while for Sample F the seed was prepared from purified charcoal-filtered titanium sulfate. Following precipitation, the samples were washed, boiled with dilute sulfuric acid and mixed with 2.0% of rutile seed on a $TiO_2$ basis, prepared according to U.S. Pat. 2,494,492. Following addition of the rutile seed, the samples were filtered, washed and calcined to rutile $TiO_2$. The products were visually rated for brightness against a laboratory brightness standard with the following results.

| Sample: | Pigment brightness |
| --- | --- |
| E | 99 |
| F | 101 |

The color brightness test procedure is applicable to all grades of titanium dioxide pigments. It consists of a visual comparison of highly pigmented wet oil pastes under standardized light conditions. A set of pigment standards has been established on an arbitrary numerical scale.

The sample paste is prepared by admixing the 4 grams of pigment with the oil so that the final consistency of the paste is equal to that of the control paste. The color oil is a mixture of equal parts of linseed oil and soya bean oil.

After the standard paste and the sample paste have been prepared, equal amounts of each are placed side by side near the top of a sheet of pulldown paper of 16 lb. weight. The pastes are then pulled down with a pulldown blade having a clearance of 0.015". The pulldowns are then visually compared against the standard for brightness and tone in a controlled light booth.

All samples are graded against the standard which most nearly matches it for brightness, anatase being graded against anatase standards and rutile against rutile. When the variation is more than one point in either brightness or tone, a pulldown of the test sample against another standard is made so that the grading is bracketed. Gradings are made only after the display has aged for one minute. In no case should more than three minutes elapse between making the pulldown and the rating.

It is thus seen that the process of the invention markedly improves the color brightness of titanium dioxide when the clarified titanium salt solution, e.g. the titanium sulfate, is utilized as the precursor for hydrous titania suspensions useful as hydrolysis seed and as the source of hydrous titania coatings of $TiO_2$ pigments.

We claim:

1. In a process for improving the color brightness of titanium dioxide pigment which process includes the steps of: admixing an aqueous slurry of titanium dioxide with an aqueous titanium sulfate solution; adjusting the pH of said admixed dispersion the improvement which comprises clarifying said titanium sulfate solution before said admixture by contacting said solution with activated charcoal and separating the clarified solution from said charcoal.

2. The method of claim 1 wherein the titanium solution is treated with a reducing agent before contacting with charcoal.

3. In a process for the production of titanium dioxide pigments of improved color brightness wherein hydrous titania is precipitated from titanium sulfate-iron sulfate liquor in the presence of hydrolysis seed, the improvement which comprises preparing said seed from a titanium sulfate solution clarified by contacting said solution with activated charcoal.

4. The method of claim 3 wherein said solution is treated with zinc metal.

5. In a process for improving the color brightness of titanium dioxide pigment which process includes the steps of:
(a) precipitating hydrous titania from a titanium sulfate-iron sulfate liquor in the presence of a hydrolysis seed;
(b) washing, drying and calcining said hydrous titania;
(c) slurry said calcined solids in water;
(d) admixing said slurry with an aqueous titanium sulfate solution;
(e) adjusting the pH of said admixed dispersion to 5 to 9; and
(f) recovering the $TiO_2$ solids from said slurry, the improvement which comprises contacting a titanium sulfate solution with charcoal and recovering the clarified solution from said charcoal to provide said admixed titanium sulfate solution and the precursor source for said hydrolysis seed.

References Cited
UNITED STATES PATENTS

| | | | |
|---|---|---|---|
| 3,434,853 | 3/1969 | Heywood et al. | 106—300 |
| 3,501,271 | 3/1970 | Twist et al. | 106—300 |
| 3,617,217 | 11/1971 | Heywood et al. | 106—300 |
| 3,625,650 | 12/1971 | Libera et al. | 106—300 |

JAMES E. POER, Primary Examiner

UNITED STATES PATENT OFFICE
CERTIFICATE OF CORRECTION

Patent No. 3,761,298      Dated September 25, 1973

Inventor(s) COON, ARTHUR DELBERT; SHEEHAN, GERARD MARTIN; and, DUPREE, PAUL MONTGOMERY It is certified that error appears in the above-identified patent and that said Letters Patent are hereby corrected as shown below:

Column 5, Claim 5(c) "slurry" should read

-- slurrying --

Signed and sealed this 9th day of April 1974.

EDWARD M. FLETCHER, JR.
Attesting Officer

C. MARSHALL DANN
Commissioner of Patents